United States Patent Office 3,039,925
Patented June 19, 1962

3,039,925
COMPOSITIONS FOR THE TREATMENT OF TUBERCULOSIS
Gerhard Domagk, Wuppertal-Elberfeld, and Karl-Wolfgang Schellhammer and Siegfried Petersen, Leverkusen, and Hans-Bodo König, Wuppertal-Elberfeld, Germany, assignors, by mesne assignments, to Farbenfabriken Bayer Aktiengesellschaft, a corporation of Germany
No Drawing. Filed Apr. 21, 1958, Ser. No. 729,566
Claims priority, application Germany Apr. 24, 1957
5 Claims. (Cl. 167—65)

This invention relates generally to certain new and useful compositions of matter that are useful in chemotherapy and more particularly that are useful in treatment of strains of *Mycobacterium tuberculosis* that have developed resistance to the commonly used tuberculostatic agents such as isonicotinic acid hydrazide, streptomycin and para-amino salicylic acid.

It is now known that in the treatment of tuberculosis continuing therapy using isonicotinic acid hydrazide, streptomycin and para-amino salicylic acid results eventually in the development of strains of the disease-causing organism that are resistant to the therapeutic agent. Thus, it has become necessary in the treatment of chronic cases to substitute various drugs from time to time in order to use therapeutic agents against which the organism has not developed tolerance. The present invention provides certain novel compositions that have the unexpected characteristic of being therapeutically active against strains of *Mycobacterium tuberculosis* that are resistant to the commonly used tuberculostatic agents, isonicotinic acid hydrazide, streptomycin and para-amino salicylic acid.

The novel compositions of matter according to this invention contain a substance selected from the group consisting of 2-substituted naphthoxazole-4,9-quinones and 2-substituted naphthiazole-4,9-quinones, together with the corresponding hydroquinones and their acyl derivatives that may be represented by the general formulae:

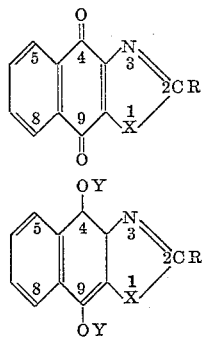

wherein X is either oxygen or sulphur, R is a lower alkyl or monocyclic aryl group, and Y is an acyl group.

Certain of the compounds represented by the foregoing formulae have been described in the technical literature, others may be prepared by analogous procedures.

Thus, K. Fries and P. Ochwat (Berichte 56, 1926 [1923]), have described 2-methyl-naphthoxazole-4,9-quinone, while other naphthoxazole-quinones may be obtained by heating, to temperatures above 100° C., a suitably selected 2-amino-3-hydroxy-(or 3-halo)-1,4 naphthoquinone with an anhydride or halide of a carboxylic acid having more than 2 carbon atoms.

Also 2-methyl-naphthothiazole-4,9-quinone has been described in the literature by A. I. Kiprianow and A. W. Stzenko, (Ukrain. Chem. J. 19: 508 [1953]). Higher homologues of compounds of this type can be prepared as described in German Pat. 485,322.

Compounds of this type with good tuberculostatic activity are 2-methyl-naphthoxazole-4,9-quinone and 2-methyl-naphthothiazole-4,9-quinone.

It is known that the corresponding hydroquinones of certain quinones having chemotherapeutic usefulness possess approximately equal physiological activity. In the present case, however, the corresponding naphthoxazole- and naphthothiazole-hydroquinones are very sensitive to oxidation and therefore are not very stable and for this reason, instead of using the free hydroquinones, it is preferred to employ compounds wherein the hydroxyl groups are acylated by reaction with inorganic or organic acids.

Certain of these compounds too, have been described in the literature. For example, K. Fries and P. Ochwat (loc. cit.) subjected 2-methyl-naphthoxazole-4,9-quinone to reductive acetylation with zinc and acetic anhydride and obtained 2-methyl-4,9-diacetoxy-naphthoxazole-4,9-hydroquinone, a compound described in Beilstein also under 1',4'-diacetoxy-4-methyl-(naphtho-2',3',4,5- oxazole). By these or similar procedures it is possible to also prepare other acylated hydroquinones having the above set forth formula.

The value of these compounds in the chemotherapy of tuberculosis organisms will be apparent from the following tables, wherein the activities of four characteristic representatives of the class of compounds of the foregoing formula are compared with isonicotinic acid hydrazide (INH) and with 4-acetylaminobenzalthiosemicarbazone (thiosemicarbazone).

The following four compounds are referred to in the tables by index letters: A, referring to 2-methyl-naphthoxazole-4,9-quinone; B, referring to 2-phenyl-naphthoxazole-4,9-quinone; C, referring to 2-methyl-naphthoxazole-4,9-di(methoxyacetoxy)hydroquinone; and D, referring to 2-methyl-naphthiazole-4,9-quinone.

These compounds were tested against different strains of *Mycobacterium tuberculosis* organisms of which strain H 37 Rv possesses normal sensitivity, strain 262 is resistant to INH, and strain B 511 is thiosemicarbazone-resistant. The experiments were carried out with Hohn-4 nutrient medium and an incubation period of 24 days.

In the tables, 0=no growth; 2=heavy growth.

STRAIN H 37 Rv (STRAIN WITH NORMAL SENSITIVITY)

| Dilution | A | B | C | D | INH |
|---|---|---|---|---|---|
| 1:20,000 | 0 | 0 | 0 | 0 | 0 |
| 1:40,000 | 0 | 0 | 0 | 0 | 0 |
| 1:50,000 | 0 | 0 | 0 | 0 | 0 |
| 1:80,000 | 0.5 | 0 | 0.5 | 0.5 | 0 |
| 1:100,000 | 1 | 0 | 1.5 | 1 | 0 |
| 1:160,000 | 2 | 1.5 | 2 | 2 | 0 |
| 1:200,000 | 2 | 2 | 2 | 2 | 0 |
| Controls | 2 | 2 | 2 | 2 | 2 |

STRAIN 262 (INH-RESISTANT)

| Dilution | A | B | C | INH |
|---|---|---|---|---|
| 1:20,000 | 0 | 0 | 0 | 2 |
| 1:40,000 | 0 | 0 | 0 | 2 |
| 1:50,000 | 0 | 0 | 0 | 2 |
| 1:80,000 | 0 | 0 | 0 | 2 |
| 1:100,000 | 0 | 0 | 0 | 2 |
| 1:160,000 | 0.5 | 1.5 | 0 | 2 |
| 1:200,000 | 1.5 | 2 | 0 | 2 |
| 1:320,000 | 2 | 2 | 0 | 2 |
| Controls | 2 | 2 | 2 | 2 |

STRAIN B 511 (THIOSEMICARBAZONE-RESISTANT)

| Dilution | A | B | C | Thiosemi-carbazone |
|---|---|---|---|---|
| 1:20,000 | 0 | 0 | 0 | 2 |
| 1:40,000 | 0 | 0 | 0 | 2 |
| 1:50,000 | 0 | 0 | 0 | 2 |
| 1:80,000 | 0 | 0 | 0 | 2 |
| 1:100,000 | 0 | 0 | 0 | 2 |
| 1:160,000 | 1.5 | 2 | 0.5 | 2 |
| 1:200,000 | 2 | 2 | 1.5 | 2 |
| 1:320,000 | 2 | 2 | 2 | 2 |
| Controls | 2 | 2 | 2 | 2 |

Particularly high activity was observed against doubly resistant strains. Thus, in the case of the doubly resistant strain RS 125, employing an optimal nutrient medium, compound A produced complete inhibition at a dilution of 1:1 million, and partial inhibition was observed even at 1:50 million. With compound D the same strain was inhibited at a dilution as low as 1:1 million. Activity was also observed in animal experiments (with mice).

It will be obvious from the foregoing that the compounds have good tuberculostatic activity. However, therapeutic application of these compounds requires, of course, that they be sufficiently well tolerated and, as may be seen from the following data values, obtained with compound A, toleration must be considered good.

Preparation A is tolerated by mice of 20 grams body weight when the drug is administered subcutaneously as 0.3 milliliter of a 2% by weight aqueous suspension or when given orally as 1 milliliter of the same solution.

Rat, orally:
  1.0 g./kg., 10% suspension in gum tragacanth, 0/0/3
  3.0 g./kg., 30% suspension in gum tragacanth, 1/1/3
  5.0 g./kg., 25% suspension in gum tragacanth, 3/3/3
Rabbits, orally:
  1.0 g./kg. in form of gum tragacanth suspension; 1 animal, no abnormalities
  2.0 g./kg. in form of gum tragacanth suspension, 1 animal died during night
Cat, orally:
  2.0 g./kg. in form of gum tragacanth suspension, 1 animal, no abnormalities
Rat, i./p.:
  0.1 g./kg. 1% in tragacanth suspension, 0/0/3
  0.2 g./kg., 2% in tragacanth suspension, 1/1/3
  0.5 g./kg., 5% in tragacanth suspension, 3/3/3

Repeated oral administration to rabbits gave favorable results.

Consequently, it is evident that the drugs can be used for the preparation of therapeutic agents, such as capsules, tablets, emulsions, etc., by conventional methods.

As additives for the preparation of tablets the following materials may be used, for example: corn starch, lactose, talcum, magnesium stearate, cocoa butter, as well as agents designed to improve taste and odor.

It will be evident from the foregoing data that the compounds represented by the formulae do not attain the effectiveness of the best of the known tuberculostatic agents, particularly that of isonicotinic acid hydrazide, when used against "normally resistant" (ie., non-resistant) strains of *Mycobacterium tuberculosis*. The value of the compounds is fully utilized only when they are used against resistant or doubly resistant strains of bacteria. For this reason particularly active tuberculostatic drugs are obtained by mixing the compounds with known, effective tuberculostatic drugs so that both the "normally resistant" and the resistant strains are affected simultaneously. Known tuberculostatic drugs especially preferred for the preparation of such mixtures are isonicotinic acid hydrazide and its tuberculostatically active derivatives, and thiosemicarbazones of aromatic or heterocyclic aldehydes; and in addition, streptomycin, and para-aminosalicylic acid.

Animal experiments again prove the effectiveness of such mixtures:

A combination of 1 part by weight of compound A, 1 part by weight of 2-pyridinaldehyde thiosemicarbazone, and 8 parts by weight of isonicotinic acid hydrazide, inhibited doubly resistant strain RS 125 in dilutions down to 1:100,000. This dilution is adequate to assure a satifactory effect with simple isonicotinic acid hydrazide, or thiosemicarbazone-resistant strains, and all normal strains. This combination is even more effective against normal strains than isonicotinic acid hydrazide alone.

To facilitate a fuller and more complete understanding of the subject matter of the present invention and of how the novel compositions of matter pursuant thereto may best be prepared, certain specific examples herewith follow, but it is clearly to be understood that these examples are provided by way of illustration merely and are not to be construed as imposing any limitation upon the invention defined in the subjoined claims.

EXAMPLE 1

A homogeneous mixture is prepared of the following ingredients in substantially the proportions by weight indicated and the mixture then is made into tablets for pharmaceutical use in the conventional manner:

50 milligrams of 2-methyl-naphthoxazole-4,9-quinone
110 milligrams corn starch
30 milligrams lactose
9 milligrams talcum
1 milligram magnesium stearate The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 2

A homogeneous mixture is prepared of the following ingredients in substantially the proportions by weight indicated and the mixture then is made into tablets for pharmaceutical use in the conventional manner:

100 milligrams of 2-methyl-naphthoxazole-4,9-quinone
110 milligrams corn starch
30 milligrams lactose
9 milligrams talcum
1 milligram magnesium stearate The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 3

A homogeneous mixture is prepared of the following ingredients in substantially the proportions by weight indicated and the mixture then is made into tablets for pharmaceutical use in the conventional manner:

10 milligrams of 2-methyl-naphthoxazole-4,9-quinone
110 milligrams corn starch
30 milligrams lactose
9 milligrams talcum
1 milligram magnesium stearate The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 4

A homogeneous mixture is prepared of the following ingredients in substantially the proportions by weight indicated and the mixture then is made into tablets for pharmaceutical use in the conventional manner:

10 milligrams of 2-methyl-naphthoxazole-4,9-quinone
90 milligrams isonicotinic acid hydrazide
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 5

A homogeneous mixture is prepared of the following ingredients in substantially the proportions by weight indicated and the mixture then is made into tablets for pharmaceutical use in the conventional manner:

10 milligrams of 2-methyl-naphthoxazole-4,9-quinone
70 milligrams isonicotinic acid hydrazide
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 6

A homogeneous mixture is prepared of the following ingredients in substantially the proportions by weight indicated and the mixture then is made into tablets for pharmaceutical use in the conventional manner:

20 milligrams of 2-methyl-naphthoxazole-4,9-quinone
90 milligrams isonicotinic acid hydrazide
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 7

A homogeneous mixture is prepared of the following ingredients in substantially the proportions by weight indicated and the mixture then is made into tablets for pharmaceutical use in the conventional manner:

20 milligrams of 2-methyl-naphthoxazole-4,9-quinone
70 milligrams isonicotinic acid hydrazide
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 8

A homogeneous mixture is prepared of the following ingredients in substantially the proportions by weight indicated and the mixture then is made into tablets for pharmaceutical use in the conventional manner:

50 milligrams of 2-methyl-naphthiazole-4,9-quinone
110 milligrams corn starch
30 milligrams lactose
9 milligrams talcum
1 milligram magnesium stearate The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 9

A homogenous mixture is prepared of the following ingredients in substantially the proportions by weight indicated and the mixture then is made into tablets for pharmaceutical use in the conventional manner:

100 milligrams of 2-methyl-naphthiazole-4,9-quinone
110 milligrams corn starch
30 milligrams lactose
9 milligrams talcum
1 milligram magnesium stearate The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 10

A homogeneous mixture is prepared of the following ingredients in substantially the proportions by weight indicated and the mixture then is made into tablets for pharmaceutical use in the conventional manner:

10 milligrams of 2-methyl-naphthiazole-4,9-quinone
110 milligrams corn starch
30 milligrams lactose
9 milligrams talcum
1 milligram magnesium stearate The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 11

A homogeneous mixture is prepared of the following ingredients in substantially the proportions by weight indicated and the mixture then is made into tablets for pharmaceutical use in the conventional manner:

10 milligrams of 2-methyl-naphthiazole-4,9-quinone
90 milligrams isonicotinic acid hydrazide
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 12

A homogeneous mixture is prepared of the following ingredients in substantially the proportions by weight indicated and the mixture then is made into tablets for pharmaceutical use in the conventional manner:

10 milligrams of 2-methyl-naphthiazole-4,9-quinone
70 milligrams isonicotinic acid hydrazide
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 13

A homogeneous mixture is prepared of the following ingredients in substantially the proportions by weight indicated and the mixture then is made into tablets for pharmaceutical use in the conventional manner:

20 milligrams of 2-methyl-naphthiazole-4,9-quinone
90 milligrams isonicotinic acid hydrazide
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 14

A homogeneous mixture is prepared of the following ingredients in substantially the proportions by weight indicated and the mixture then is made into tablets for pharmaceutical use in the conventional manner:

20 milligrams of 2-methyl-naphthiazole-4,9-quinone
70 milligrams isonicotinic acid hydrazide
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 15

A homogeneous mixture is prepared of the following ingredients in substantially the proportions by weight indicated and the mixture then is made into tablets for pharmaceutical use in the conventional manner:

10 milligrams of 2-methyl-naphthoxazole-4,9-quinone
80 milligrams isonicotinic acid hydrazide
20 milligrams gamma-pyridinaldehyde thiosemicarbazone
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 16

A homogeneous mixture is prepared of the following ingredients in substantially the proportions by weight indicated and the mixture then is made into tablets for pharmaceutical use in the conventional manner:

10 milligrams of 2-methyl-naphthiazole-4,9-quinone
80 milligrams isonicotinic acid hydrazide
20 milligrams gamma-pyridinaldehyde thiosemicarbazone
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 17

A homogeneous mixture is prepared of the following ingredients in substantially the proportions by weight indicated and the mixture then is made into tablets for pharmaceutical use in the conventional manner:

10 milligrams of 2-methyl-naphthoxazole-4,9-quinone
80 milligrams isonicotinic acid hydrazide
20 milligrams para-acetylaminobenzaldehyde thiosemicarbazone
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 18

A homogeneous mixture is prepared of the following ingredients in substantially the proportions by weight indicated and the mixture then is made into tablets for pharmaceutical use in the conventional manner:

10 milligrams of 2-methyl-naphthiazole-4,9-quinone
80 milligrams isonicotinic acid hydrazide
20 milligrams para-acetylaminobenzaldehyde thiosemicarbazone
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 19

A homogeneous mixture is prepared of the following ingredients in substantially the proportions by weight indicated and the mixture then is made into tablets for pharmaceutical use in the conventional manner:

20 milligrams of 2-methyl-naphthoxazole-4,9-quinone
80 milligrams isonicotinic acid hydrazide
10 milligrams gamma-pyridinaldehyde thiosemicarbazone
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 20

A homogeneous mixture is prepared of the following ingredients in substantially the proportions by weight indicated and the mixture then is made into tablets for pharmaceutical use in the conventional manner:

20 milligrams of 2-methyl-naphthiazole-4,9-quinone
80 milligrams isonicotinic acid hydrazide
10 milligrams gamma-pyridinaldehyde thiosemicarbazone
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 21

A homogeneous mixture is prepared of the following ingredients in substantially the proportions by weight indicated and the mixture then is made into tablets for pharmaceutical use in the conventional manner:

20 milligrams of 2-methyl-naphthoxazole-4,9-quinone
80 milligrams isonicotinic acid hydrazide
10 milligrams para - acetylaminobenzaldehyde thiosemicarbazone
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 22

A homogeneous mixture is prepared of the following ingredients in substantially the proportions by weight indicated and the mixture then is made into tablets for pharmaceutical use in the conventional manner:

20 milligrams of 2-methyl-naphthiazole-4,9-quinone
80 milligrams isonicotinic acid hydrazide
10 milligrams para - acetylaminobenzaldehyde thiosemicarbazone
90 milligrams corn starch
9 milligrams talcum
1 milligram cocoa butter The product so obtained is found to be a therapeutically effective, pharmaceutically acceptable form of drug combination adapted to use in treatment of disease conditions produced by strains of *Mycobacterium tuberculosis* resistant to isonicotinic acid hydrazide.

EXAMPLE 23

*Synthesis of 2-Ethyl-Naphthoxazole-4,9-Quinone*

About 50 grams of 2-amino-3-chloro-1,4-naphthoquinone is heated to a vigorous boil with 200 cubic centimeters of propionic anhydride for 1 hour. Upon cooling, yellow crystals precipitate which melt at 184° C. after recrystallization from xylene and from glacial acetic acid. The yield of pure, light-yellow 2-ethylnaphthoxazole-4,9-quinone amounts to approximately 15.5 grams.

This product, when made into a homogeneous mixture with suitable pharmaceutical agents and diluents as described in any of the foregoing examples, provides a therapeutically useful composition of like utility.

EXAMPLE 24

*Synthesis of 2-Para-Tolyl-Naphthoxazole-4,9-Quinone*

About 30 grams of 2-amino-3-chloro-1,4-naphthoquinone is heated to boiling with 75 grams of p-toluic anhydride, 250 cubic centimeters of nitrobenzene, and 0.5 cubic centimeter of concentrated sulfuric acid during a 6 hour period. The nitrobenzene and part of the p-toluic acid are then distilled off with steam, and the residue is stirred for 1 hour with an approximately 10% by weight caustic soda solution. Subsequently, it is filtered off by suction and washed with methanol, benzene, and ether. Recrystallization from nitrobenzene gives a straw-colored crystalline powder melting at 305° C. The yield of 2-para-tolyl-naphthoxazole-4,9-quinone amounts to about 18 grams.

This product, when made into a homogeneous mixture with pharmaceutical agents, and diluents as described in any of the foregoing examples, provides a therapeutically useful composition of like utility.

EXAMPLE 25

*Synthesis of 2-Cyclohexyl-Naphthoxazole-4,9-Quinone*

The starting material used in this synthesis, 2-amino-3-hydroxy-1,4-naphthoquinone, may be prepared as described by G. Carrara and G. Bonacci in Chimiae Industria, 26, 75–77 (1944).

About 30 grams of 2-amino-3-hydroxy-1,4-naphthoquinone is heated to boiling, while being stirred, with 100 cubic centimeters of hexahydrobenzoyl chloride, 200 cubic centimeters of xylene, and 5 drops of concentrated sulfuric acid during a 3 hour period. Cooling with ice follows. The precipitated crystals are filtered off.

Recrystallization from xylene gives a light-yellow crystalline powder of melting point 167° C. representing 2-cyclohexyl-naphthoxazole-4,9-quinone. The yield is about 18 grams.

This product, when made into a homogeneous mixture with pharmaceutical agents and diluents as described in any of the foregoing examples, provides a therapeutically useful composition of like utility.

EXAMPLE 26

*Synthesis of 2-Isobutyl-Naphthoxazole-4,9-Quinone*

The 2 - isovaleroylamino-3-chloro-1,4-naphthoquinone used as the starting material in this synthesis may be prepared as described by J. R. E. Hoover in J.A.C.S., 76, 4150 (1954).

About 17 grams of 2-isovalerylamino-3-chloro-1,4-naphthoquinone is heated to boiling in 100 cubic centimeters of nitrobenzene during an 8 hour period. The nitrobenzene is subsequently distilled off with steam, and the residue filtered off and washed with some alcohol. The yield of 2 - isobutyl-naphthoxazole - 4,9 - quinone amounts to about 8 grams, melting at 200° C. following recrystallization from glacial acetic acid and gasoline.

This product when made into a homogeneous mixture with pharmaceutical agents and diluents as described in any of the foregoing examples, provides a therapeutically useful composition of like utility.

EXAMPLE 27

*Synthesis of 2-Phenyl-Naphthoxazole-4,9-Quinone*

The starting material used in this synthesis, 2-benzamido-3-hydroxy-1,4-naphthoquinone, may be made in the manner described by D. P. Vitovskii and M. M. Shemyakin in J. Gen. Chem. U.S.S.R., 21, 1137 (1951).

About 5 grams of 2-benzoylamino-3-hydroxy-1,4-naphthoquinone is heated to boiling with 100 cubic centimeters of decahydronaphthalene and 3 drops of concentrated sulfuric acid for 4 hours. Upon cooling, yellowish crystals precipitate which, upon recrystallization from glacial acetic acid and toluene, melt at 269° C. The yield of pure, yellow 2-phenyl-naphthoxazole-4,9-quinone is about 2 grams.

This product, when made into a homogeneous mixture with pharmaceutical agents and diluents as described in any of the foregoing examples, provides a therapeutically useful composition of like utility.

EXAMPLE 28

*Synthesis of 2-Methyl-Naphthoxazole-4,9-Bis-Methoxy-Acetoxy-Hydroquinone*

About 67 grams of 2-methyl-naphthoxazole-4,9 quinone is mixed with 140 grams of zinc dust, and the mixture is added to 500 grams of methoxyacetic anhydride at 120–145° C. After the reaction has subsided, the mixture is filtered while hot, and the residue is boiled 3 times in succession with individual 200 milliliter portions of glacial acetic acid. The combined, cooled filtrates are treated with water, whereupon the new compound precipitates. After filtration by suction and drying at 60° C., 100 grams of crude material is obtained. The material is purified by recrystallization from xylene or carbon tetrachloride. The compound melts at 165–166° C.

Analogously, 2-methyl-naphthoxazole-4,9-bis-acetoxy-hydroquinone and 2-methyl-naphthiazole-4,9-bis-acetoxy-hydroquinone can be obtained, respectively, from 2-methyl-naphthoxazole-4,9-quinone and 2-methyl-naphthiazole-4,9-quinone by treatment with zinc dust and acetic anhydride.

These three hydroquinone derivatives, when made into homogeneous mixtures with pharmaceutical agents and diluents as described in any of the foregoing examples, provide therapeutically useful compositions of like utility.

Having thus described the subject matter of this invention, what it is desired to secure by Letters Patent of the United States is:

1. A composition of matter useful in the chemotherapeutic treatment of tuberculosis infections that comprises, 2-methyl-naphthoxazole - 4,9 - quinone in a substantially homogeneous mixture with at least one tuberculostatic agent selected from the group consisting of isonicotinic acid hydrazide, para-acetylamine-benzaldehyde-thiosemicarbazone; 2-pyridinaldehyde thiosemicarbazone; streptomycin and para-aminosalicylic acid; and a physiologically acceptable inert pharmaceutical carrier.

2. A composition of matter useful in the chemotherapeutic treatment of tuberculosis infections that comprises 2-methyl-naphthoxazole-4,9-quinone, 2 - pyridinaldehyde thiosemicarbazone, and isonicotinic acid hydrazide.

3. A composition of matter useful in the chemotherapeutic treatment of tuberculosis infections that comprises one part by weight of 2-methyl-naphthoxazole-4,9 - quinone; one part by weight of 2-pyridinaldehyde thiosemicarbazone; and eight parts by weight of isonicotinic acid hydrazide.

4. A composition of matter useful in the chemotherapeutic treatment of tuberculosis infections that comprises one part by weight of 2-methyl-naphthoxazole-4,9-quinone; two parts by weight of 2-pyridinaldehyde thiosemicarbazone; and eight parts by weight of isonicotinic acid hydrazide.

5. A composition of matter useful in the chemotherapeutic treatment of tuberculosis infections that comprises two parts by weight of 2-methyl-naphthoxazole-4,9-quinone; one part by weight of 2-pyridinaldehyde thiosemicarbazone; and eight parts by weight of isonicotinic acid hydrazide.

References Cited in the file of this patent

UNITED STATES PATENTS 1,726,265   Herzberg _____ Aug. 27, 1928

OTHER REFERENCES

Chemical Abstr. (1), vol. 17 (1923), 3334–3336.
Chemical Abstr. (2), vol. 49 (1955), 260–261.
Szybalski et al.: Am. Rev. of Tuberculosis 65: 6, pages 768–770, June 1952.